C. W. HUBBARD.
Shovel.
No. 220,760. Patented Oct. 21, 1879.
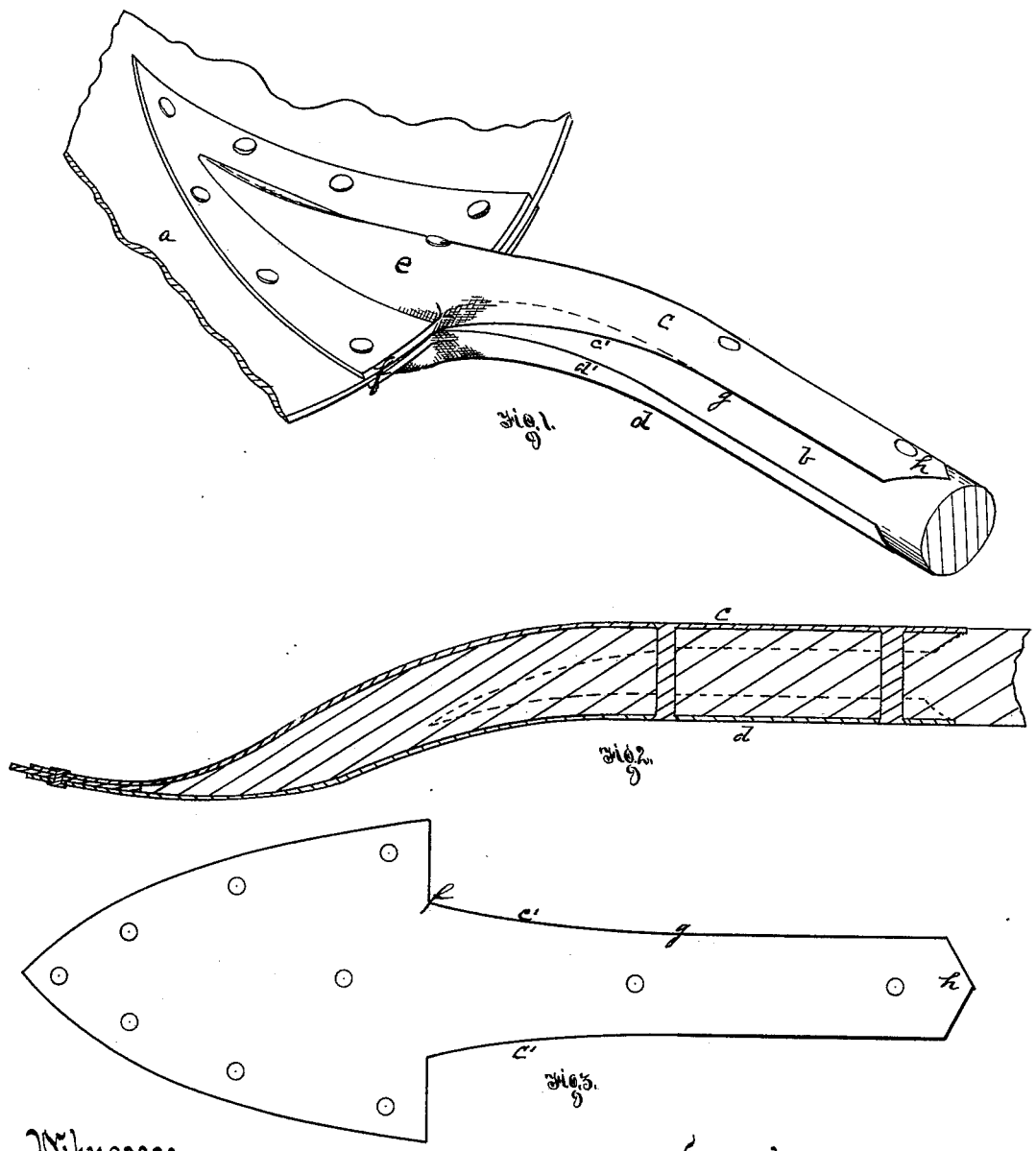
Witnesses.
John K. Smith
James W. Friend
Inventor.
Charles W. Hubbard
by Bakewell & Kerr
Attorneys

UNITED STATES PATENT OFFICE.

CHARLES W. HUBBARD, OF PITTSBURG, PENNSYLVANIA.

IMPROVEMENT IN SHOVELS.

Specification forming part of Letters Patent No. 220,760, dated October 21, 1879; application filed September 15, 1879.

*To all whom it may concern:*

Be it known that I, CHARLES W. HUBBARD, of Pittsburg, in the county of Allegheny and State of Pennsylvania, have invented a new and useful Improvement in Shovels; and I do hereby declare the following to be a full, clear, and exact description thereof, reference being had to the accompanying drawings, forming part of this specification, in which—

Figure 1 is a perspective view of my improved shovel, and Fig. 2 is a top view. Fig. 3 is a sectional view of the same.

Like letters of reference indicate like parts.

My invention consists in forming the straps of the shovel of sufficient width to meet at their edges at the shoulder, and of a regular gradual taper back over the bend to the straight part of the handle, and either tapered or straight from that point to their ends.

Heretofore handles have been attached by a socket in the blade, and by straps which ran back from the socket, one on the upper and one on the lower side of the handle; but their edges did not meet, and they had either square or rounded corners at their union with the blade. Handles have also been attached by means of a tubular socket and fastened by straps running from the socket, one on the upper and one on the under side, the said straps having widely-separated parallel edges throughout their length, and leaving a square or rounding edge at the sides of their union with the socket.

The objection to the first form mentioned is, that it was not as strong as is always desirable, the sides of the handle not being supported, and the square or rounded edges of the socket forming an edge, over which the handle was liable to be bent and broken.

The objection to the second form was, that it also possessed the breaking-edges above the tubular part of the socket; that, owing to the bend of the handle, making the surface covered by the upper strap longer than the lower one, the strap could not be cut out and fitted uniformly on the handle, and that as the handles were not of uniform size it was difficult if not impossible to lay down and fit the straps to them with any degree of nicety or perfection of finish without a cost which would virtually exclude the shovel from the market.

The purpose of my invention is to obviate these difficulties, and to produce a shovel which is very strong at the point where the handle is united to the blade, which has no breaking-edge over which the handle may be broken, which strengthens the handle in the knee or bend, which is easily and cheaply fitted to the handle whatever be the variation in the size of handles, which may be handsomely finished, and in which the leverage of the handle is distributed along the strap, so as to avoid an undue strain at any one point.

To enable others skilled in the art to make and use my invention, I will describe its construction by reference to the drawings.

The blade of the shovel is shown at $a$, the socket at $e$, the straps at $c$ and $d$, and the wooden handle at $b$.

The straps $c\ d$ are cut of a slightly-curved uniform taper from the shoulder $f$ to the point $g$, which is at the limit of or beyond the bend of the handle $b$, and then they run either straight or tapering from that point to the end $h$. When laid down on the handle the edges $c'\ d'$ begin to diverge at the shoulder $f$, and from that point to the point $g$ separate by a gradual uniform divergence.

It will be noticed that the straps present no lateral edge to the handle. Hence there is no breaking-edge, while on the other hand the handle is substantially surrounded and strengthened from the blade to a point beyond the bend.

As the edges of the straps do not meet, and as the straps are entirely independent of each other, they can be laid down on the handle with the same facility as the old narrow strap.

The curvature of the taper enables me to lay the strap down on the handle with more facility and greater smoothness than a straight taper, owing to the fact that it is bent around the rounding face of the handle, and for this reason I prefer to make the taper slightly curved.

The tapering strap distributes the leverage of the handle along the whole strap and makes it proportionately strong at all points.

This shovel can be finished neatly at a very small cost, and has a handsome and workmanlike appearance.

What I claim as my invention, and desire to secure by Letters Patent, is—

In a shovel or similar implement having a blade or scoop, a socket, and a bent handle, the straps formed to meet at the shoulders, and from that point tapering regularly to the straight part of the handle, substantially as and for the purpose specified.

In testimony whereof I, the said CHARLES W. HUBBARD, have hereunto set my hand this 6th day of September, 1879.

CHARLES W. HUBBARD.

Witnesses:
JAMES H. PORTE,
T. B. KERR.